United States Patent
Daugs et al.

(10) Patent No.: US 10,800,888 B2
(45) Date of Patent: Oct. 13, 2020

(54) GLYCIDYL ETHER ALKOXYLATE BLOCK COPOLYMERS

(71) Applicants: Dow Global Technologies LLC, Midland, MI (US); Rohm and Haas Company, Collegeville, PA (US)

(72) Inventors: Edward D. Daugs, Midland, MI (US); John J. Rabasco, Allentown, PA (US); Antony K. Van Dyk, Blue Bell, PA (US); Tianlan Zhang, Garnet Valley, PA (US)

(73) Assignees: Rohm and Haas Company, Collegeville, PA (US); Dow Global Technologies, LLC, Midland, MI (US)

( * ) Notice: Subject to any disclaimer, the term of this patent is extended or adjusted under 35 U.S.C. 154(b) by 0 days.

(21) Appl. No.: 16/016,769

(22) Filed: Jun. 25, 2018

(65) Prior Publication Data
US 2018/0371174 A1    Dec. 27, 2018

Related U.S. Application Data

(60) Provisional application No. 62/525,342, filed on Jun. 27, 2017.

(51) Int. Cl.
| | | |
|---|---|---|
| *C08G 81/00* | (2006.01) | |
| *C08G 65/26* | (2006.01) | |
| *C08G 65/22* | (2006.01) | |
| *C09D 171/02* | (2006.01) | |

(52) U.S. Cl.
CPC ............. *C08G 81/00* (2013.01); *C08G 65/22* (2013.01); *C08G 65/2606* (2013.01); *C08G 65/2609* (2013.01); *C09D 171/02* (2013.01)

(58) Field of Classification Search
CPC ................ C08G 65/22; C08G 65/2606; C08G 65/2609; C08G 81/00; C09D 171/02
See application file for complete search history.

(56) References Cited

U.S. PATENT DOCUMENTS

| | | | | |
|---|---|---|---|---|
| 3,399,149 A | * | 8/1968 | Garty | C08G 65/12 528/92 |
| 3,790,499 A | * | 2/1974 | Udding | C08G 65/269 502/168 |
| 6,669,953 B1 | * | 12/2003 | Kamiyama | A61K 9/7053 424/449 |
| 7,323,528 B2 | * | 1/2008 | Saldivar Guerra | C08F 293/005 526/329.2 |
| 8,367,762 B2 | * | 2/2013 | Jaunky | B01F 17/0028 524/505 |
| 8,859,684 B2 | | 10/2014 | Chu et al. | |
| 2011/0144248 A1 | | 6/2011 | Zong et al. | |
| 2011/0257326 A1 | * | 10/2011 | Jaunky | C09D 5/027 524/539 |
| 2015/0368396 A1 | * | 12/2015 | Muller | C08G 18/48 528/76 |
| 2017/0080397 A1 | * | 3/2017 | Ishigure | C08G 65/08 |
| 2017/0107189 A1 | * | 4/2017 | Brennan | C07D 303/23 |
| 2017/0174793 A1 | * | 6/2017 | Brennan | C08G 65/2603 |
| 2017/0240692 A1 | * | 8/2017 | Roland | C08G 59/1438 |
| 2018/0355107 A1 | * | 12/2018 | Daugs | C09D 5/024 |

FOREIGN PATENT DOCUMENTS

| | | | | |
|---|---|---|---|---|
| GB | 1337190 | | 11/1973 | |
| WO | WO-2017155845 A1 | * | 9/2017 | ........... C09D 103/08 |

OTHER PUBLICATIONS

Fujita, "Alkanes as Stereoisomers. Enumeration by the Combination of Two Dichotomies for Three-Dimensional Trees," MATCH Commun. Math. Comput. Chem. 57 (2007), 299-340. (Year: 2007).*
Taboada et al., "Block Copolymers of Ethylene Oxide and Phenyl Glycidyl Ether: Micellization, Gelation, and Drug Solubilization," Langmuir 2005, 21, 5263-5271. (Year: 2005).*
F. Alloin et al., 60 Solid State Ionics, 3-9 (1993) (Year: 1993).*
Taboada P. et al: "Block copolymers of ethylene oxide and phenyl glycidyl ether", LANGMUIR, vol. 21, 2005, pp. 5263-5271.

* cited by examiner

*Primary Examiner* — Alexander R Pagano
(74) *Attorney, Agent, or Firm* — Reid S. Willis

(57) ABSTRACT

The present invention relates to a compound having the following structure I:

where $Ar^1$, R, $R^1$, E, m, n, x, y, p, and s are defined herein. The compound of the present invention is useful as an open time additive in waterborne coatings compositions, particularly waterborne paint compositions.

9 Claims, No Drawings

GLYCIDYL ETHER ALKOXYLATE BLOCK COPOLYMERS

BACKGROUND OF THE INVENTION

The present invention relates to glycidyl ether alkoxylate block copolymers, which are useful as open time additives in coatings formulations.

Government regulations and market movement continually drive toward zero volatile organic compounds (VOC) for coating formulations. Consequently, waterborne formulations that are free of volatile solvents and coalescents have become increasingly popular in the industry. Nevertheless, paint properties have been compromised due to this sea change; among them is open time, which is the period of time during which a freshly applied paint film can be reworked without leaving brush marks. In a solvent-borne system, open time is about 30 to 45 min; in a typical waterborne formulation, open time is on the order of 3 to 5 min.

U.S. Pat. No. 8,859,684 B2 discloses the preparation of phenyl glycidyl ether alkoxylates that are useful as open time additives in waterborne paint formulations. The best open times reported were 8 minutes using 2.5% by weight of the additive. However, the use of such high concentrations of a surfactant to achieve a marginal increase in open time is of limited commercial value due to the additive's contribution to the degradation of other properties of the final coating. Accordingly, there is an ongoing need in the art to find an additive for waterborne formulations that significantly increases open time over currently available additives without degrading other properties of the final coating, such as film adhesive and cohesive strength, hardness, block resistance, early blister resistance, scrub and wash resistance, stain resistance, and mar resistance.

SUMMARY OF THE INVENTION

The present invention addresses a need in the art by providing a compound having the following structure I:

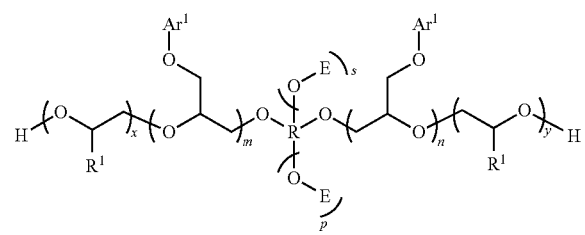

where the fragment

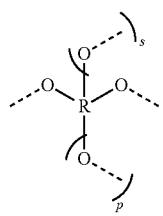

is a structural unit of a $C_2$-$C_{60}$ linear or a $C_3$-$C_{60}$ branched or cyclic diol, triol, or tetrol optionally functionalized with O atoms or aryl groups or both, or a structural unit of an unsubstituted aromatic diol, triol, or tetrol, or a structural unit of an aromatic diol, triol, or tetrol substituted with from 1 to 3 $C_1$-$C_6$ alkyl groups;

each $R^1$ is independently H or $C_1$-$C_6$ alkyl;

E is represented by the following structure:

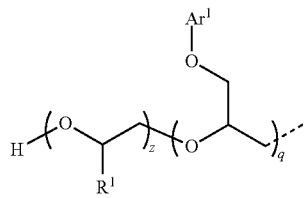

m, n, and q are each independently from 1 to 20; x, y, and z are each independently from 1 to 50; p is 0 or 1; s is 0 or 1; and each $Ar^1$ is independently unsubstituted phenyl or naphthyl, or phenyl or naphthyl substituted with from 1 to 3 $C_1$-$C_6$ alkyl groups.

The compound of the present invention is useful as an open time additive in waterborne coatings compositions, particularly waterborne paint compositions.

DETAILED DESCRIPTION OF THE INVENTION

The present invention is a compound having the following structure I:

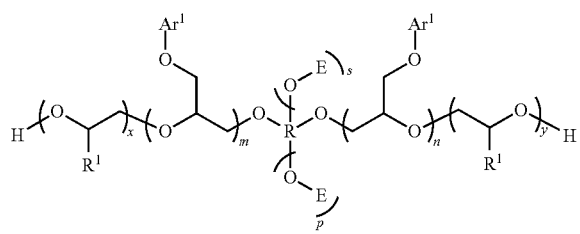

where the fragment

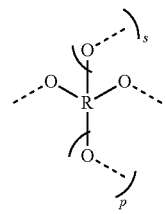

is a structural unit of a $C_2$-$C_{60}$ linear or a $C_3$-$C_{60}$ branched or cyclic diol, triol, or tetrol optionally functionalized with O atoms or aryl groups or both, or a structural unit of an unsubstituted aromatic diol, triol, or tetrol, or a structural unit of an aromatic diol, triol, or tetrol substituted with from 1 to 3 $C_1$-$C_6$ alkyl groups;

each $R^1$ is independently H or $C_1$-$C_6$ alkyl;

E is represented by the following structure:

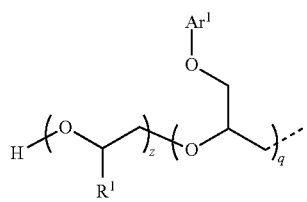

m, n, and q are each independently from 1 to 20; x, y, and z are each independently from 1 to 50; p is 0 or 1; s is 0 or 1; and each $Ar^1$ is independently unsubstituted phenyl or naphthyl, or phenyl or naphthyl substituted with from 1 to 3 $C_1$-$C_6$ alkyl groups.

Examples of suitable diols useful for preparing the compound of the present invention include $C_2$-$C_{20}$ alkane diols such as 1,2-ethane diol, 1,3-propane diol, 1,4-butane diol, and 1,6-hexane diol, as well as alkoxylated derivatives of these diols; polyoxyalkylene diols of the type H—(OCH$_2$CH(R$^2$))$_b$—OH, where b is from 2 to 30, preferably 2, 3, or 4; and more preferably 3; and $R^2$ is H, methyl, or ethyl; aromatic diols such as 1,4-benzenedimethanol, catechol, resorcinol, and hydroquinone, as well as alkoxylated derivatives of these diols.

Example of suitable triols include trimethylolpropane, phloroglucinol, hydroxyquinol, pyrogallol, and glycerol, as well as alkoxylated derivatives of these triols; examples of suitable tetrols are pentaerythritol and benzenetetrol and alkoxylated derivatives of these tetrols.

Each $Ar^1$ is preferably independently phenyl, cresyl, or p-t-butylphenyl; preferably, m and n are each independently in the range of from 1, more preferably from 2, to 10, more preferably to 6, and most preferably to 5. Preferably, x and y are each independently from 5, more preferably from 10, to 30, more preferably to 25. Preferably, p and s are both 0.

Because each $R^1$ is independently H or $C_1$-$C_6$-alkyl, the alkylene oxide groups ((OCH$_2$CHR$^1$)$_n$) can be random or block copolymers. Preferably, each $R^1$ is independently H, methyl, or ethyl; more preferably H or methyl; most preferably each $R^1$ is H.

Examples of subclasses of compounds of the present invention are represented by the following structures:

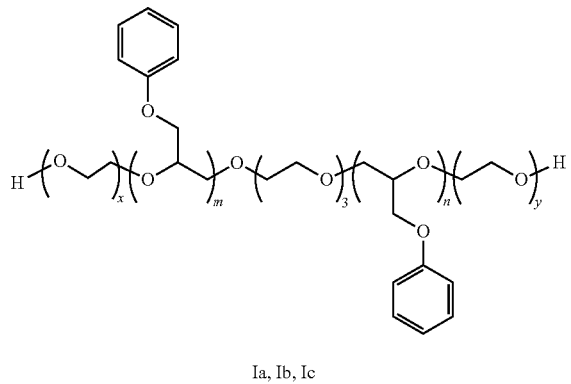

Ia, Ib, Ic

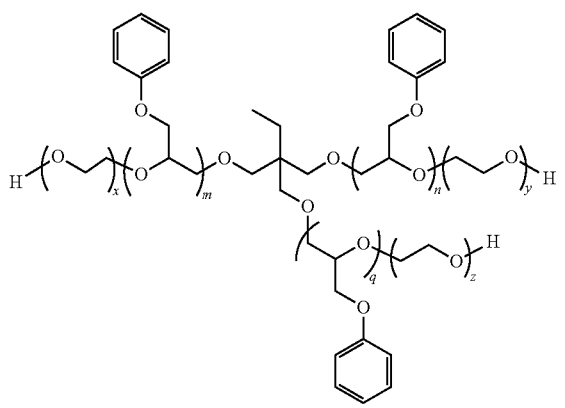

Id where, for Ia, m+n=4; and x+y=30; for Ib, m=1, n=1, and x+y=45; for Ic, m+n=6; and x+y=45; and for Id, m+n+q=6; and x+y+z=40.

The compound of the present invention can be conveniently prepared by first contacting a diol, triol, or tetrol with an aryl glycidyl ether in the presence of a catalytic amount of a suitable base such as KOH, under conditions sufficient to prepare an aryl glycidyl ether oligomer intermediate, then contacting the intermediate with an alkylene oxide such as ethylene oxide under conditions sufficient to form the desired compound I. Preferably, the polyol is a diol, more preferably triethylene glycol. The aryl alcohol is preferably phenol, p-t-butylphenol, or a cresol, and the aryl glycidyl ether is preferably phenyl glycidyl ether, p-t-butylphenol glycidyl ether, or a cresyl glycidyl ether.

The number average molecular weight ($M_n$) of the compound, as determined by matrix assisted laser desorption ion mass spectrometry (MALDI-MS), is preferably in the range of from 300, more preferably from 500, and most preferably from 1000 g/mol, to preferably 20,000, more preferably to 15,000, more preferably to 10,000, and most preferably to 5,000 g/mol.

The compound of the present invention can be used as an open time additive for a coatings composition, which includes binder, rheology modifier, and any or all of the following materials: dispersants, pigments, defoamers, surfactants, solvents, extenders, coalescents, biocides, opaque polymers, and colorants.

EXAMPLES

Example 1—Preparation of Phenyl Glycidyl Ether Ethoxylate Block Copolymer Ia

A 500-mL round-bottom flask equipped with a temperature controlled heating mantle, an addition funnel, a reflux/distillation head, and overhead stirrer was charged with triethyleneglycol (61.13 g, 0.407 mole) and KOH flakes (1.18 g, 90% pure). Phenyl glycidyl ether (247.47 g, 1.65 moles) was added over 5 h at 100° C., after which time the mixture was cooled to room temperature. A portion of the resultant intermediate (86.7 g) was charged into a conical bottom 2-L Parr reactor. The reactor was sealed, pressure checked, purged with N$_2$, then heated to 120° C. Ethylene oxide (151.0 g) was added at a rate of 0.2 to 0.3 g/min. The mixture was held at 120° C. for 1 h, then cooled to 60° C. before unloading the product (652.7 g). The reaction product was mixed with 0.18 g of acetic acid to for, product Ia (m+n=4; and x+y=30.)

Example 2—Preparation of Phenyl Glycidyl Ether Ethoxylate Block Copolymer Ib

A 500-mL round-bottom flask equipped with a temperature controlled heating mantle, an addition funnel, a reflux/distillation head and overhead stirrer was charged with triethyleneglycol (102.69 g, 0.711 mole) and KOH flakes (2.09 g, 90% pure). Phenyl glycidyl ether (206.26 g, 1.37 moles) was added over 8 h at 95° C. then cooled to room temperature. The mixture was stirred overnight at 95° C., then cooled. A portion of the intermediate was removed (149.5 g, Intermediate A), and the remainder was reheated to 95° C. A second portion of phenyl glycidyl ether (220.55 g, 1.47 moles) was added over 4 h. The mixture was stirred overnight at 95° C., then cooled to unload a second intermediate (333.5 g, Intermediate B). A portion of Intermediate A (49.4 g) was charged into a conical bottom 2-L Parr reactor. The reactor was sealed, pressure checked, purged with N$_2$, then heated to 120° C. Ethylene oxide (218.2 g) was added at a rate of 0.3 to 1 g/min. The mixture was held at 120° C. for 1.5 h, then cooled to 70° C. before unloading the product (260.2 g). The reaction product was mixed with 0.21 g of acetic acid to form product Ib (m=1, n=1, and x+y=45).

Example 3—Preparation of Phenyl Glycidyl Ether Ethoxylate Block Copolymer Ic

A portion of Intermediate B from Example 2 (158.8 g) was charged into a conical bottom 2-L Parr reactor. The reactor was sealed, pressure checked, purged with $N_2$, then heated to 120° C. Ethylene oxide (298.5 g) was added at a rate of 0.3 to 1 g/min. The mixture was held at 120° C. for 1.5 h, then cooled to 80° C. before unloading the product (447.0 g). The reaction product was mixed with 0.17 g of acetic acid to form Ic (m+n=6; and x+y=45)

Example 4—Preparation of Phenyl Glycidyl Ether Ethoxylate Block Copolymer Id

A 500-mL round-bottom flask equipped with a temperature controlled heating mantle, an addition funnel, a reflux/distillation head and overhead stirrer was charged with 1,1,1-tris(hydroxymethyl)propane (TMP, 59.59 g, 0.444 mole) and heated to 70° C. before addition of KOH flakes (2.75 g, 90% pure). The solution was heated to 95° C. whereupon phenyl glycidyl ether (400.0 g, 2.66 moles) was added over 4 h. The mixture was stirred overnight at 90° C., then cooled. A portion of this intermediate (221.9 g) was charged into a conical bottom 2-L Parr reactor. The reactor was sealed, pressure checked, purged with $N_2$, then heated to 120° C. Ethylene oxide (378.0 g) was added at a rate of 1 to 2 g/min. The mixture was held at 120° C. for 1.5 h, then cooled to 80° C. before unloading the product (561.3 g). The reaction product was mixed with 1.5 g of acetic acid to form Id (m+n+q=6; and x+y+z=40).

$M_n$ Measurement of Additive by MALDI-MS

MALDI mass spectra were acquired on a Bruker Daltonics ultraflex MALDI-TOF mass spectrometer equipped with a nitrogen laser (λ=337 nm). In the MALDI experiment, 20 mg of 2,5-dihydroxybenzoic acid was dissolved in 1 mL of THF as the MALDI matrix. The sample solution in MeOH was premixed with the matrix solution at a ratio of 1:20. To facilitate ionization of the species in the sample mixture, NaI was added into the sample/matrix mixture. A 0.3 μl sample of the mixture was then placed on the sample plate and was air dried for MALDI-MS analysis. Reflectron mode was selected in the analysis to enhance the resolution of the mass spectra.

Paint Formulation:

Paint formulations with and without open time additive were prepared in accordance with Table 1.

TABLE 1

Paint Formulation with Open Time Additive

| Material Name | Pounds | Gallons |
|---|---|---|
| RHOPLEX ™ HG-706 Binder | 584.1 | 66.0 |
| BYK-024 Defoamer | 1.0 | 0.1 |
| Propylene Glycol | 4.3 | 0.5 |
| TRITON ™ X-100 Surfactant | 4.4 | 0.5 |
| Water | 16.7 | 2.0 |
| KATHON ™ LX 1.5% Biocide | 1.5 | 0.2 |
| TAMOL ™ 2002 Dispersant | 2.0 | 0.2 |
| Ammonia (28%) | 1.0 | 0.1 |
| Ti-Pure R-746 $TiO_2$ | 285.0 | 14.7 |
| Water | 20.0 | 2.4 |

TABLE 1-continued

Paint Formulation with Open Time Additive

| Material Name | Pounds | Gallons |
|---|---|---|
| Texanol Coalescent | 7.9 | 1.0 |
| ACRYSOL ™ RM-2020E Rheology Modifier | 20.0 | 2.3 |
| ACRYSOL ™ RM-725 Rheology Modifier | 3.0 | 0.4 |
| BYK-024 Defoamer | 2.0 | 0.2 |
| Open Time Additive (40% aq.) | 25.8 | 2.84 |
| Water | 79 | 9.5 |
| Totals | 1030 | 100 |

RHOPLEX, TRITON, KATHON, TAMOL, and ACRYSOL are all Trademarks of The Dow Chemical Company or its Affiliates.

Table 2 shows the impact on open time when using the additives of the present invention.

TABLE 2

Open Time Data

| Ex. No. | Additive | $M_n$ MALDI-MS (g/mole) | Open Time (min) |
|---|---|---|---|
| Example 1 | Ia | 1854 | 15.0 |
| Example 2 | Ib | 2175 | 11.0 |
| Example 3 | Ic | 2690 | 13.0 |
| Example 4 | Id | 2617 | 9.0 |
| Comp. 1 | none | NA | 6.0 |

The data demonstrate a marked increase in open time for a paint formulation containing the additive of the present invention.

The invention claimed is:
1. A compound having the following structure I:

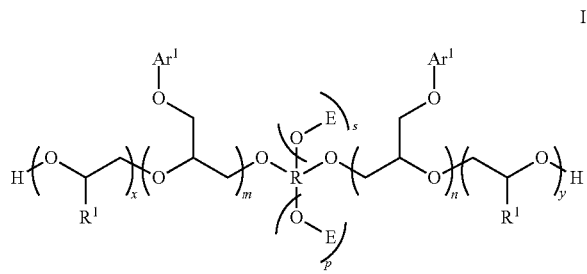

where the fragment

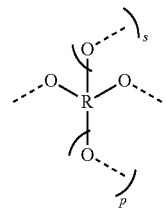

is a structural unit of a $C_2$-$C_{60}$ linear or a $C_3$-$C_{60}$ branched or cyclic diol, triol, or tetrol optionally functionalized with aryl groups, or a structural unit of an unsubstituted aromatic diol, triol, or tetrol, or a structural unit of an aromatic diol, triol, or tetrol substituted with from 1 to 3 $C_1$-$C_6$ alkyl groups;

each $R^1$ is independently H or $C_1$-$C_6$ alkyl;

E is the following structure:

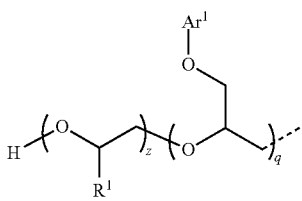

m, n, and q are each independently from 1 to 20; x, y, and z are each independently from 1 to 50;
p is 0 or 1; s is 0 or 1; and
each $Ar^1$ is independently unsubstituted phenyl or naphthyl, or phenyl or naphthyl substituted with from 1 to 3 $C_1$-$C_6$ alkyl groups;
with the proviso that the number average molecular weight ($M_n$) of the compound of structure I, as measured by matrix assisted laser desorption ion mass spectrometry is in the range of from 300 g/mol to 20000 g/mol.

2. The compound of claim 1 wherein p is 0; s is 0; each $R^1$ is independently H or $CH_3$; m and n are each independently in the range of from 1 to 10; and x and y are each independently in the range of from 5 to 30.

3. The compound of claim 1 wherein the fragment:

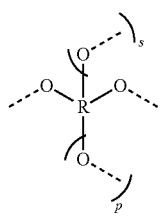

is a structural unit of a) a diol which is a $C_2$-$C_{20}$ alkane diol or an alkoxylated derivative thereof; or a polyoxyalkylene diol of the type H—(OCH$_2$CH(R$^2$))$_b$—OH, where b is from 2 to 30, and $R^2$ is H, methyl, or ethyl; or an aromatic diol or an alkoxylated derivative thereof; or b) a triol or an alkoxylated derivative thereof; or c) a tetrol or an alkoxylated derivative thereof.

4. The compound of claim 2 wherein the fragment:

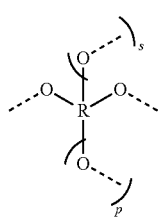

is a structural unit of a polyoxyalkylene diol of the type H—(OCH$_2$CH$_2$)$_b$—OH, where b is from 2 to 30.

5. The compound of claim 4 which has an $M_n$ in the range of from 1000 g/mole to 5000 g/mole; wherein each $R^1$ is H; and b is 2, 3, or 4.

6. The compound of claim 5 where b is 3.

7. A coating composition comprising the compound of claim 1, a binder, a rheology modifier and at least one material selected from the group consisting of dispersants, pigments, defoamers, surfactants, solvents, extenders, coalescents, biocides, opaque polymers, and colorants.

8. A compound having the following structure I:

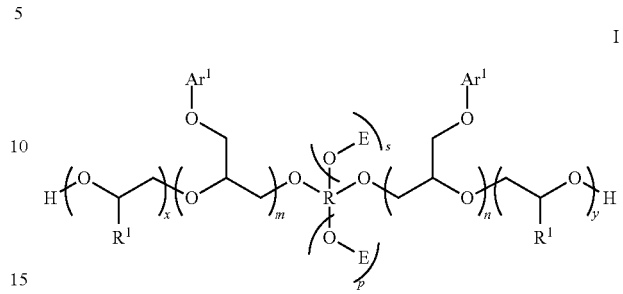

where the fragment

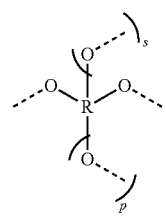

is a structural unit of a $C_2$-$C_{60}$ linear or a $C_3$-$C_{60}$ branched or cyclic diol, triol, or tetrol optionally functionalized with aryl groups, or a structural unit of an unsubstituted aromatic diol, triol, or tetrol, or a structural unit of an aromatic diol, triol, or tetrol substituted with from 1 to 3 $C_1$-$C_6$ alkyl groups;
each $R^1$ is independently H or $C_1$-$C_6$ alkyl;
wherein E has the following structure:

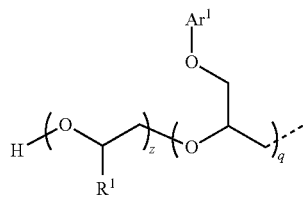

p is 0 or 1; s is 0; and
each $Ar^1$ is unsubstituted phenyl;
wherein the compound of structure I is represented by either of the following two structures:

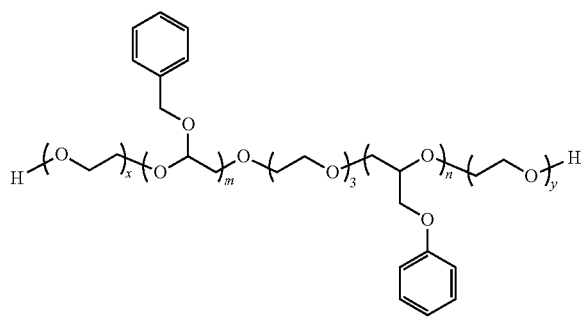

wherein m+n=4; and x+y=30; or m=1, n=1, and x+y=45; or m+n=6; and x+y=45; or

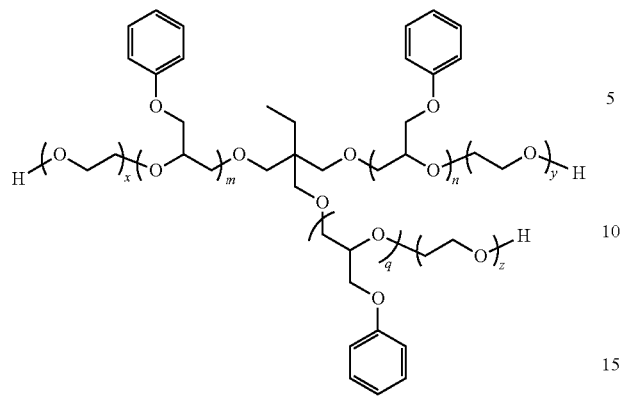
where m+n+q=6; and x+y+z=40.
9. A coating composition comprising the compound of claim 8, a binder, a rheology modifier and at least one material selected from the group consisting of dispersants, pigments, defoamers, surfactants, solvents, extenders, coalescents, biocides, opaque polymers, and colorants.
* * * * *